United States Patent [19]

Fuse et al.

[11] 4,346,793
[45] Aug. 31, 1982

[54] MOTION SNUBBING DEVICE

[75] Inventors: Takeshi Fuse, Kamakura; Masaru Sekine, Hadano, both of Japan

[73] Assignees: NHK Spring Co., Ltd., Yokohama; NHK Precision Co., Ltd., Kanagawa, both of Japan

[21] Appl. No.: 119,552

[22] Filed: Feb. 7, 1980

[30] Foreign Application Priority Data

Feb. 14, 1979 [JP] Japan .................................. 54-15635

[51] Int. Cl.³ .............................................. F16F 7/10
[52] U.S. Cl. ................................... 188/134; 188/72.3;
188/185; 188/187; 188/378; 188/216; 192/54;
192/103 C; 248/58; 248/636
[58] Field of Search ............... 188/134, 129, 184, 185,
188/187, 72.3, 216, 85, 72.7, 378, 379, 380;
267/8 D; 192/7, 54, 103 C; 248/58, 636

[56] References Cited

U.S. PATENT DOCUMENTS

| 294,262 | 2/1884 | Owen | 188/184 X |
|---|---|---|---|
| 814,362 | 3/1906 | Dill | 188/134 |
| 2,627,082 | 2/1953 | Tappan | 188/1 B X |
| 3,367,456 | 2/1968 | Bohnhoff | 188/134 |
| 3,983,965 | 10/1976 | Wright, Jr. | 188/1 B |
| 4,103,760 | 8/1978 | Yang | 188/134 X |
| 4,196,796 | 4/1980 | Kanamaru | 188/1 B |
| 4,236,606 | 12/1980 | Sunakoda et al. | 188/134 X |

Primary Examiner—George E. A. Halvosa
Attorney, Agent, or Firm—Frishauf, Holtz, Goodman & Woodward

[57] ABSTRACT

A motion snubbing device using an inertia mass, which is disposed within a housing and supported for free rotation on a shaft which is rotated with relative motion of telescoped support members. A spring plate is secured to the shaft and faces one end of the inertia member. A plurality of torque transmission balls are each interposed between each of recesses formed in the plate member near the periphery thereof and each of recesses formed in the corresponding end face of the inertia mass at corresponding positions. The plate is provided on its side opposite its recesses and near its periphery with brake shoes, and the housing has a frictional surface facing and adapted to cooperate with these brake shoes.

5 Claims, 7 Drawing Figures

MOTION SNUBBING DEVICE

BACKGROUND OF THE INVENTION

This invention relates to motion snubbing devices, which are provided between a supporting body and a supported body to permit low acceleration displacements of the two relative to each other while restricting high acceleration displacements caused due to external forces.

Snubbing devices of this sort are used for supporting piping systems in chemical plants, atomic power plants and so forth.

Many proposals regarding this type of device have hitherto been made. These devices are generally required to have functions of permitting slow motion of the supported pipe or the like due to changes of the temperature thereof while restricting high acceleration motion of the pipe that might otherwise be caused when sudden forces such as forces produced at the time of occurrence of an earthquake are exerted to the pipe, thus preventing damage to or rupture of the pipe.

The prior-art devices include a type using an inertia mass. This type of device has a drawback in that if the inertia mass is increased in size for providing sufficient snubbing effects upon motions of accelerations in excess of the permissible range, not only the device is increased in size but also considerable snubbing forces are produced even in the case of motions in the permissible low acceleration range and have adverse effects upon the slow motion of the pipe.

There is another type of device which makes use of a brake. This type of device requires additional component parts such as auxiliary springs for automatically releasing the braking force.

SUMMARY OF THE INVENTION

An object of the invention is to provide an improved motion snubbing device, which can overcome the aforementioned drawbacks inherent in the prior-art devices and at the same time has a simple construction, can be inexpensively manufactured and has excellent snubbing effects.

The above object of the invention is achieved by a motion snubbing device, which comprises a pair of telescoped support members, a shaft adapted to be rotated with the relative motion of the support members, an elastic plate member capable of acting as a spring and supported by the shaft for rotation in unison therewith, a rotary inertia mass or member spaced apart from and facing the plate member, the aforesaid plate member and rotary inertia mass or member being formed in their opposing faces with respective paired grooves or recesses, a torque transmitting means comprising balls or rollers received in the respective paired grooves or recesses, and frictional pads or brake shoes provided on the opposite side face of the plate member and facing and capable of being engaged with a frictional surface of a housing accommodating the frictional pads or brake shoes.

With the above construction, at the time when high speed rotation is transmitted to the shaft via the support members the plate member is rotated in unison with the shaft while the inertia member cannot follow the rotation of the plate member due to its own inertia. With the delay of the inertia member, a relative angular displacement is produced between the inertia member and the plate member. As a result, the balls or rollers between the two members tend to come out of the recesses and cause the brake shoes on the plate member to be brought into engagement with and urged against the frictional surface, whereby braking forces against the high speed rotation of the shaft are applied.

Since positive braking action is effected by the engagement between the brake shoes and frictional surface in a range of acceleration movement to be suppressed, the inertia member may be small in size. In addition, the above construction does not use any coil spring as a means for bringing about the frictional braking action but uses an elastic plate member of a simple construction, it is possible to improve the durability and reduce the cost of manufacture.

When steam or like heat medium passes through a pipe, the pipe is caused to undergo thermal expansion, while also it is given comparatively strong vibrations of a small amplitude. As a result, the snubber supporting the pipe experiences a continuous external force exerted in one direction together with vibratory forces. In such a case, with the conventional snubber the inertia member is locked when brake is applied thereto, and this is liable to cause rupture of the system. With the device according to the invention, the inertia member is not locked even when a continuous force is applied to the device in one direction, but the device functions to permit motion in one direction while having a snubbing effect upon strong vibrations.

DETAILED DESCRIPTION OF THE PREFERRED EMBODIMENTS

Some preferred embodiments of the invention will now be described with reference to the accompanying drawings.

Figure 1:
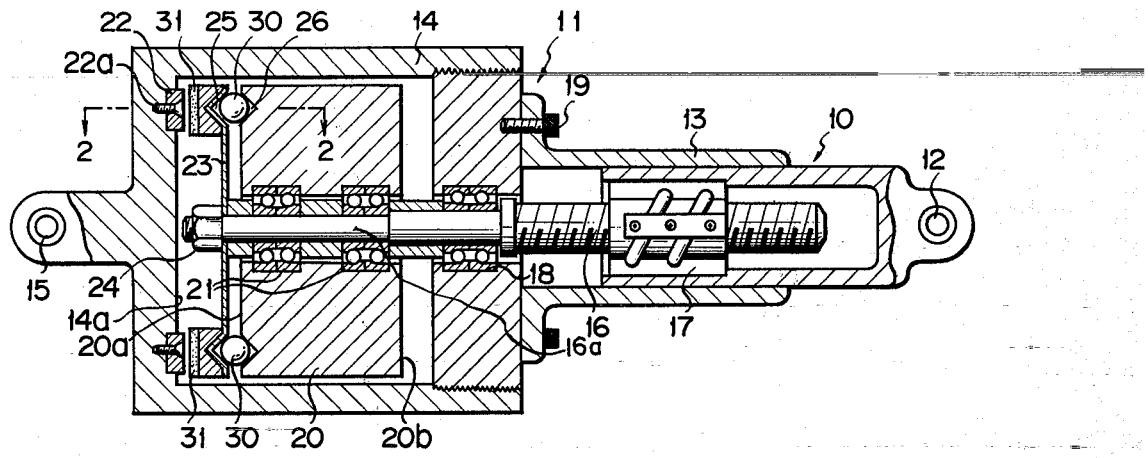
FIG. 1 is an axial or longitudinal sectional view of the motion snubbing device according to the invention.

Referring now to FIG. 1, which shows an embodiment of the motion snubbing device, a telescoping pair of support members are designated at 10 and 11. The member 10 (hereinafter referred to as first member) is cylindrical and has a closed end portion formed with a mounting hole 12, by which the first member 10 is mounted on a supported body (not shown), for instance a pipe in a piping system provided in an atomic power plant.

The other member 11 (hereinafter referred to as second member) includes a cylindrical member 13, in which the first member 10 is telescoped for axial movement, and a cylindrical housing 14 of an increased diameter secured by a bolt 19 to the cylindrical portion 13 and provided at the end opposite the cylindrical portion 13 with a mounting portion 15 formed with a mounting hole 15, by which the second member 11 is secured to a supporting body (not shown), for instance a building structure in the power plant.

A shaft 16 axially extends through the interior of the first and second members 10 and 11, and it is screwed in a ball screw mechanism 17 which is secured to the first member 10. The mechanism 17 itself is well known in the art, and when relative axial motion of the members 10 and 11 is produced, it converts the motion to a corresponding rotational moment to rotate the shaft 16. The shaft 16 is supported for free rotation by a ball bearing 18 mounted in the housing 14, and it has a portion 16a extending through the housing 14.

The interior of the housing 14 is defined by a cylindrical peripheral wall and parallel radial walls at the opposite ends. One of the radial end walls, namely wall 14a, carries brake discs 22 secured by screws 22a to it. These brake discs 22 may be omitted, and instead the wall 14a may be directly used as the brake surface. Within the housing 14a cylindrical inertia member 20 is supported for free rotation on the extended portion 16a of the shaft 16 via ball bearings 21. The ball bearings 21 are constructed such as to receive axial forces as well as radial forces exerted to the inertia member 20, as is seen from FIG. 1. Alternatively, the ball bearings 21 may be of a construction capable of receiving only radial forces, and a separate bearing for receiving axial forces may be additionally provided on one of the ends 20a and 20b, of the inertia member 20, for instance end 20b.

Figure 2:
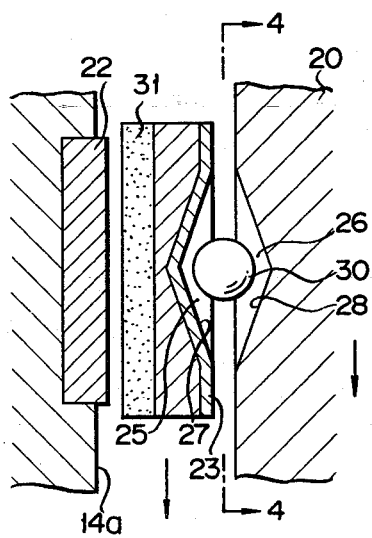
FIG. 2 is an enlarged-scale fragmentary sectional view taken along line 2—2 in FIG. 1.
Figure 4:
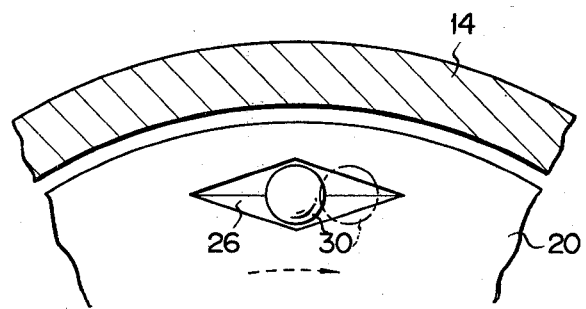
FIG. 4 is a fragmentary sectional view taken along line 4—4 in FIG. 2.

A spring plate 23 is secured by a nut 24 to the free end of the extended portion 16a of the shaft 16 for rotation in unison therewith, and it radially extends parallel to and spaced from the other end 20a of the inertia member 20. It is made of a material having a spring character, and its peripheral portion is highly elastic and capable of being flexed by external forces. While in the instant embodiment the spring plate 23 has a disc-like form, it may be replaced with a strip-like plate or a plurality of radially arranged strip-like plates. The plate 23 is formed on one side thereof, namely on the side facing the end 20a of the inertia member 20, and near its periphery with a plurality of suitably spaced-apart grooves or recesses 25, and also the end 20a of the inertia member 20 is formed in corresponding positions with grooves or recesses 26. As is seen from FIG. 1, both these recesses 25 and 26 have a V-shaped profile in a section taken along the axis of the shaft 16. In a section taken in a peripheral direction as shown in FIG. 2, these recesses 25 and 26 have a flattened V-shaped form. As is seen, they are defined by a plurality of inclined surfaces 27 and 28. Further, in a section perpendicular to the axial direction as shown in FIG. 4, each of these recesses has a rhombic shape. While FIG. 4 shows only a recess 26 formed in the inertia member 20, the recesses 25 formed in the plate 23 also have the same shape. These recesses 25 and 26 may be conical as well, and in this case manufacture can be simplified. Balls 30 are received as torque transmitting means in respective pairs of opposed recesses 25 and 26 respectively formed in the plate 23 and inertia member 20. Each of these balls 30 engages with the inclined surfaces of the associated recesses and is normally found at a position as shown in FIGS. 1 and 2.

When a pipe supported on the support members 10 and 11 is deformed due to a temperature change, the members 10 and 11 are moved slowly, thereby rotating the shaft 16 slowly. The plate 23 and inertia member 20 are then rotated together. During this rotation, the balls 30 remain in the same position within the associated recesses accommodating them, that is, they remain in the state shown in FIGS. 1 and 2.

The plate 23 is provided on its side opposite the recess 25 and adjacent to its periphery with brake shoes or brake pads 31. Usually, these brake shoes 31 are slightly spaced apart from and face the respective brake discs 22 provided on the radial wall 14a of the housing 14. When the shaft 16 is slowly rotated, the brake shoes 31 are not brought into contact with the discs 22.

When the shaft 16 is rotated at a high speed due to external forces, more exactly when a rotational motion of a high acceleration is produced, the plate 23 is rotated in unison with the shaft 16, but the inertia member 20 is not rotated in unison therewith because it has a considerable inertia, that is, with increase of the acceleration of the motion the inertia member 20 is delayed with respect to the rotation of the plate 23, that is, a relative angular displacement is produced between the two, thus causing the balls 30 to roll over the inclined surfaces of the associated recesses 25 and 26 in such a direction as to get out thereof against the spring force of the plate 23. As a result, the plate 23 is caused to flex so that the brake shoes 31 gradually approach the frictional surfaces of the discs 22, and ultimately the brake shoes 31 are brought into engagement with the discs 22 when a constant angular displacement is caused. Consequently, a braking force is produced, and it is transmitted from the plate 23 to the shaft 16 so as to prevent further rotation thereof. The stronger the braking force produced as described above, the move accelerated the rotation of the shaft 16. If said accelerated rotation exceeds a prescribed level, thus the shaft 16 is reliably prevented from rotation.

Thus, when sudden vibratory forces are exerted to the supported pipe in the piping system, for instance due to occurrence of an earthquake so that a sudden force is applied to the snubbing device supporting the pipe to cause rotation of the shaft 16, the snubbing device functions to stop the rotation of its shaft 16 and thus securely hold the pipe, thus preventing the breakage or rupture of the pipe. If an external force sustained by the snubbing device exceeds a prescribed acceleration level, then the rotation of the shaft is stopped. Said prescribed acceleration level is chosen to match the magnitude of a stress which is generally allowed to be applied to the pipe.

Figure 3:
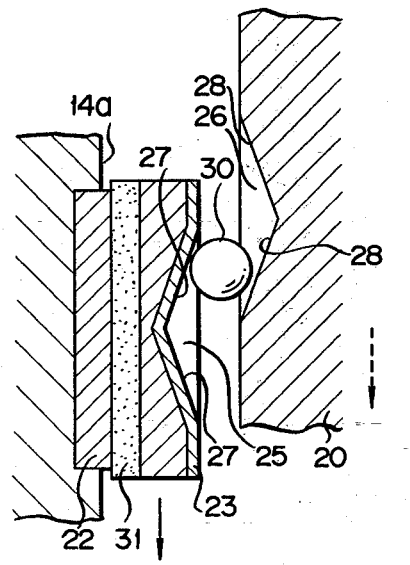
FIG. 3 shows the part shown in FIG. 2 in an operative state.

In FIG. 2, the plate 23 and inertia member 20 are shown in their state rotating in unison with each other in the direction of the arrow, with the balls 30 maintained in its stable central position within the associated paired recesses 25 and 26. This position of the typical ball 30 is shown by solid lines in FIG. 4. In FIG. 3, the plate 23 and inertia member 20 are shown, with the inertia member 20 delayed behind the plate 23 due to a high acceleration of motion, and with the balls 30 caused to roll in the direction of a broken arrow in FIG. 4. Here, the ball 30 has rolled over the inclined surfaces 27 and 28 of the recesses 25 and 26 up to the neighborhood of the ends of the recesses. Consequently, the brake shoes 31 on the plate 23 is urged against the brake discs 22 provided on the radial wall 14a of the housing, with the balls 30 displaced to a position of broken lines in FIG. 4.

While slow rotation of the shaft 16 is caused with a temperature change in the piping which is caused due to passage of a heat medium therethrough, the behavior of the device at the time when an external force directed in one direction and accompanied by comparatively strong vibratory forces is applied to the shaft 16 is important. Although with the prior-art device a braking force can be effectively applied to the inertia member for producing a snubbing effect upon strong vibrations, in the presence of a continuous external force applied in one direction the inertia member can no longer be rotated, thus bringing about a so-called locked state of the device, which is liable to cause rupture of the device or breakage of the pipe.

This problem is overcome by the device according to the invention, since the inertia member 20 is supported for free rotation on the shaft 16. More particularly, even when the rotation of the plate 23, that is, the rotation of the shaft 16, is once stopped with the brake shoes 31 on the plate 16 urged against the frictional surfaces of the discs 22 provided on the wall 14a, the inertia member 20 is free to rotate. Thus, in the presence of a continuous external force applied in one direction the inertia member 20 in the state shown in FIG. 3 is moved alone in the direction of a broken arrow in FIG. 3 for restoring the state shown in FIG. 2 by causing the rolling of the balls 30 over the inclined surfaces 28 of the respective recesses 26 formed in the inertia member 20. As a result, the plate 23 is slightly returned by its own spring force, causing the brake shoes 31 to be slightly separated from the brake discs 22 on the wall 14a or to be slightly released from the strongly urged state.

Because of the above function of the device, during the presence of a continuous external force applied to the shaft 16 in one direction the brake shoes 31 are repeatedly urged against and released from the brake discs 22 on the wall 14a and are not restrained in close contact with the brake discs 22. In this way, with the instant snubbing device both the support members are slowly moved relative to each other according to a continuous external force applied in one direction, while vibratory external forces are suppressed.

Figure 5:
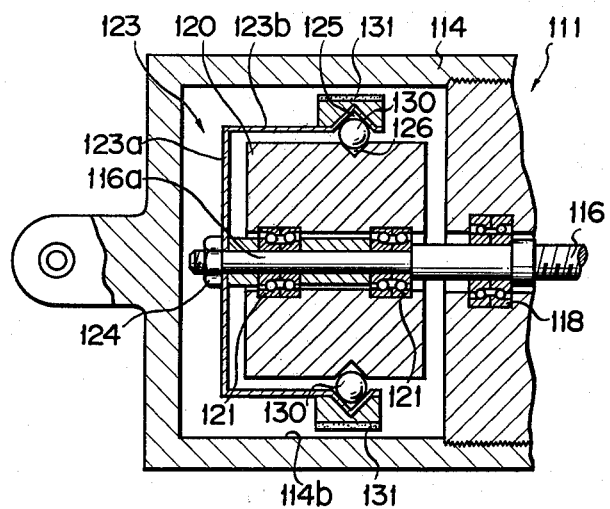
FIG. 5 is an axial or longitudinal sectional view showing another embodiment of the motion snubbing device according to the invention.

FIG. 5 shows another embodiment of the motion snubbing device according to the invention. In the Figure corresponding parts to those in the first embodiment of FIG. 1 are designated by like reference numerals with a prefix 1. Here, only housing 114 of second support member 111 is shown, and the other portion of the device which is not shown is the same as in the embodiment of FIG. 1.

Similar to the first embodiment shown in FIG. 1, inertia member 120 is rotatably supported by ball bearings 121 on the extended portion 116a of a shaft 116 rotatably supported by ball bearing 118 mounted in the housing 114, and it is supported by the ball bearings 121 with respect to axial forces as well as radial forces.

Here, a spring plate 123 which is secured by a nut 124 to the free end of the extended portion 116a of the shaft 116 has a channel-shaped form constituted by first arm portions 123a radially extending from its center and second arm portions 123b extending from the ends of the first arm portions in a direction parallel to the outer periphery of an inertia member 120 and spaced apart therefrom.

Free end portions of the second arm portions 123b of the plate 123 are provided on their side facing the outer periphery of the inertia member 120 with recesses 125 of a V-shaped sectional profile and on their other side with brake shoes 131. The outer periphery of the inertia member 120 is provided in portions thereof corresponding to the recesses 125 with respective recesses 126 also of a V-shaped sectional profile. Balls 130 are received as torque transmitting means in respective pairs of recesses 125 and 126.

As in the first embodiment, both the recesses 125 and 126 may be conical in form as well.

In the instant embodiment, the cylindrical inner wall 114b of the housing 114 serves as a frictional surface for cooperation with the brake shoes 131. In this embodiment no brake disc as separate part is provided, but such brake discs may of course be provided on the inner wall as in the first embodiment.

In the second embodiment, at the time when the shaft 116 is suddenly rotated, the brake shoes 131 are brought into contact with and urged against the frictional surface 114b of the housing 114 more quickly owing to a centrifugal force which is produced. In addition, the distance from the axis of the shaft 116 to the ball 30, that is, the working radius, can be increased compared to that in the first embodiment, so that a greater braking force can be obtained.

Figure 6:
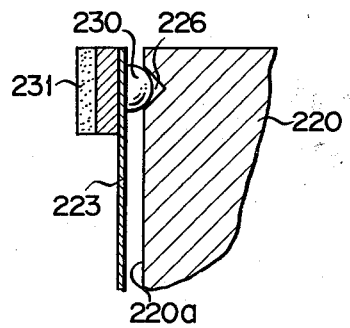
FIGS. 6 and 7 are fragmentary sectional views showing modifications of the embodiment of FIG. 1.
Figure 7:
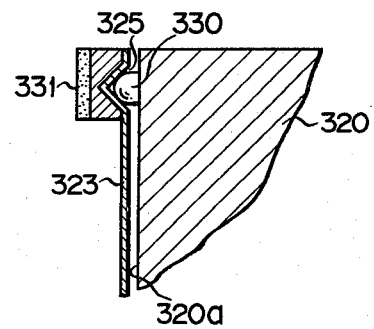

FIGS. 6 and 7 show modifications of the first embodiment.

The example of FIG. 6 comprises a semi-spherical projection 230 as torque transmitting means secured to the side of the spring plate 223 opposite the brake shoes 231 in the neighborhood of the periphery of the plate 223 and a recess 226 of a V-shaped sectional profile formed in the end 220a of the inertia member 220.

The example of FIG. 7 comprises a semi-spherical projection as torque transmitting means secured to the end 320a of the inertia member 320 and a recess 325 of a V-shaped profile formed on the side of the plate 323 opposite the brake shoes 331 adjacent to the periphery of the spring plate 323.

With the modification of FIG. 6 or 7 the same effects as in the first and second embodiments can be obtained.

Further, the ball 30 or 131 used in the first or second embodiment may be replaced with cylindrical pieces in the form of a roller, and in this case the shape of the recesses may be appropriately modified. In any case, it is necessary that the recesses are defined by inclined surfaces.

What we claim is:

1. A motion snubbing device of the self-release type comprising:
    a pair of telescoped support members capable of axial reciprocation relative to each other while being restrained from relative rotation;
    movement converting means for converting the axial movement of one of said paired support members into a rotational movement;
    a shaft supported by the other support member and coupled to said movement converting means so as to be rotated by said movement converting means;
    said other support member including a housing having a frictional surface extending in the radial direction of said shaft;
    a rotary inertia member coupled to said shaft and being rotatable relative to said shaft in a co-axial relation to said shaft while being restrained from movement in the axial direction of said shaft, said inertia member having an end face;
    first recess means formed in said end face of said inertia member at positions near the periphery of said end face and at a constant radial distance from said axis;
    an elastic plate member capable of flexing and being connected to said shaft for rotation in unison with said shaft, said elastic plate member being normally spaced apart from said end face of said inertia member;

second recess means formed on said elastic plate member on the side thereof facing said first recess means in said inertia member and at positions corresponding to said first recess means;

rolling means interposed between and received in said first and second recess means for transmitting the rotation of said elastic plate member to said inertia member; and brake shoes provided on said elastic plate member on the side thereof opposite said inertia member and facing said frictional surface of said housing, whereby as said shaft is rotated in a given direction at an increasing acceleration responsive to relative telescoping axial movement of said support members, said rolling means are moved in such a manner as to come out of the associated first and/or second recess means against the biasing force of said elastic plate member, thereby bringing said brake shoes into frictional engagement with said frictional surface of said housing to stop the rotation of said shaft; and whereby if an external force is substantially continuously applied to said telescoped support members in one given direction, the engagement of said brake shoes with said frictional surface of said housing self-releases due to said inertia member's continued rotation.

2. A motion snubbing device according to claim 1, wherein said first recess means formed in said inertia member and said second recess means formed in said elastic plate member each comprise at least two diametrically opposite recesses.

3. A motion snubbing device according to claim 1, wherein said inertia member is supported on said shaft via bearing means such that it is freely rotatable about said shaft but is incapable of axial movement relative to said shaft.

4. A motion snubbing device of the self-release type comprising:

a pair of telescoped support members capable of axial reciprocation relative to each other while being restrained from relative rotation;

movement converting means for converting the axial movement of one of said paired support members into a rotational movement;

a shaft supported by the other support member and coupled to said movement converting means so as to be rotated by said movement converting means;

said other support member including a housing having a frictional surface extending in the radial direction of said shaft, at least a portion of said shaft extending through said housing and having a free end in said housing;

an inertia member supported for free rotation on a portion of said shaft extending through said housing;

a plurality of first recesses formed in said end face of said inertia member at positions in the vicinity of the outer periphery of said inertia member, each of said first recesses being defined by inclined surfaces so as to have a generally V-shaped form in a section taken along the peripheral direction of the inertia member;

a spring plate secured to said free end of said shaft and being rotatable with said shaft, said spring plate being normally spaced apart from and substantially parallel with said end face of said inertia member;

second recesses formed in said spring plate on the side thereof facing said end face of said inertia member and at positions in the vicinity of the outer periphery of said spring plate corresponding to said respective first recesses, each of said second recesses being defined by inclined surfaces so as to have a generally V-shaped form in a section taken along the peripheral direction of the spring plate;

torque transmission balls individually interposed between the associated first and second recesses and being received in said first and second recesses for transmitting the rotation of said spring plate to said inertia member; and brake shoes provided on said spring plate on the side thereof opposite said inertia member and at positions in the vicinity of the outer periphery of said spring plate and facing said frictional surface of said housing;

whereby with an increase of the acceleration of rotation in a given direction of rotation of said shaft brought about by relative telescoping axial movement of said support members said torque transmission balls are caused to roll over the inclined surfaces of the associated first and/or second recesses, thus causing an angular displacement of said inertia member relative to said spring plate to cause flexing of said spring plate so as to bring said brake shoes into frictional engagement with said frictional surface of said housing for stopping the rotation of said shaft; and whereby if an external force is substantially continuously applied to said telescoped support members in one given direction, the engagement of said brake shoes with said frictional surface of said housing self-releases due to said inertia member's continued rotation.

5. A motion snubbing device according to claim 1 or 4, wherein said end face of said inertia member extends at right angles to the axis of said shaft.

* * * * *